United States Patent

Ratcliff

[15] 3,638,087

[45] Jan. 25, 1972

[54] GATED POWER SUPPLY FOR SONIC CLEANERS

[72] Inventor: Henry Kevin Ratcliff, Davenport, Iowa

[73] Assignee: The Bendix Corporation

[22] Filed: Aug. 17, 1970

[21] Appl. No.: 64,545

[52] U.S. Cl. ............................318/118, 310/8.1, 323/22 SC

[51] Int. Cl. ............................................................H01v 9/00

[58] Field of Search ................310/8.1; 318/118; 323/22 SC, 323/38, 16, 19

[56] References Cited

UNITED STATES PATENTS

| | | | |
|---|---|---|---|
| 3,283,179 | 11/1966 | Carlisle et al. | 323/22 SC |
| 3,271,644 | 9/1966 | McShane | 318/118 X |
| 3,121,169 | 2/1964 | Benton | 310/8.1 X |
| 3,152,295 | 10/1964 | Schebler | 318/118 |
| 3,286,158 | 11/1966 | Thatcher | 323/22 SC |
| 3,365,654 | 1/1968 | Johnston | 323/22 SC |
| 3,374,422 | 3/1968 | Blume | 323/22 SC |

*Primary Examiner*—A. D. Pellinen
*Attorney*—William N. Antonis and Plante, Hartz, Smith & Thompson

[57] ABSTRACT

A gated sonic power supply which permits selection of an optimum duty cycle and pulse repetition rate at which sonic energy must be pulsed to produce the most efficient degassing of tap water and/or uniform cavitation of a cleaning fluid. A pulse generator is used to trigger a gate within the sonic generator. The width of the pulse from the pulse generator determines the length of time that the sonic generator output signal is interrupted to give a pulse-modulated power output. The pulse width from the generator is variable to allow for the selection of a modulation width or duty cycle that gives a maximum efficiency of operation. Also, the frequency of the pulse from the pulse generator may be varied to select the optimum pulse repetition rate.

3 Claims, 2 Drawing Figures

INVENTOR.
HENRY K. RATCLIFF
BY
Plante, Hartz, Smith & Thompson
ATTORNEYS

GATED POWER SUPPLY FOR SONIC CLEANERS

BACKGROUND OF THE INVENTION

This invention relates to U.S. Pat. application Ser. No. 45,163, filed on June 10, 1970, having the same inventor and assignee as the present application.

For many years better cleaning performance has been obtained when high-frequency electrical energy that is applied to sonic transducers is pulsed at low frequencies. To achieve this result of better cleaning performance, it has been the usual practice to take advantage of AC line frequency. Circuits have been designed that pulse the sonic energy at 60 cycles or 120 cycles per second with the cycles being in synchronization with the AC line frequency. Other systems have been designed that use a commutator to switch the high-frequency energy to a number of transducers. If just one of these transducers is considered, it would appear that it is being pulsed, but not necessarily at the AC line frequency. In fact, the pulse repetition rate depends upon the speed at which the commutator is rotated, and the duty cycle depends upon the number of transducers in the system. However, no system has been disclosed that allows the selection of the optimum pulse repetition frequency and duty cycle of the electrical energy applied to the individual transducers for maximum efficiency of operation and uniform cavitation. By the proper selection of the correct pulse repetition frequency and duty cycles of the sonic energy, a more efficient mode of operation for each individual transducer can be utilized. By utilizing the proper mode of operation, the power requirements of the sonic cleaner can be greatly reduced.

SUMMARY OF THE INVENTION

It is an object of this invention to minimize the high-frequency power needed to irradiate a large area and to obtain a more uniform cavitation.

It is a further object of this invention to minimize the high-frequency power needed for sonic cleaning by using a multiple frequency power supply to pulse modulate the high-frequency power supplied to the transducers at various resonance frequencies, thereby allowing the selection of the most efficient frequency.

It is an even further object of this invention to achieve the required uniform cavitation for maximum efficiency by using a single transducer and a given resonant frequency and duty cycle, the resonant frequency and duty cycle being determined in an independent test setup.

It is a still further object of this invention to modify an existing sonic cleaner by gating the control signal to the power output stage to produce a pulse modulated output, the frequency and duration of the pulse being variable.

DESCRIPTION OF THE PREFERRED EMBODIMENT

Figure 1:
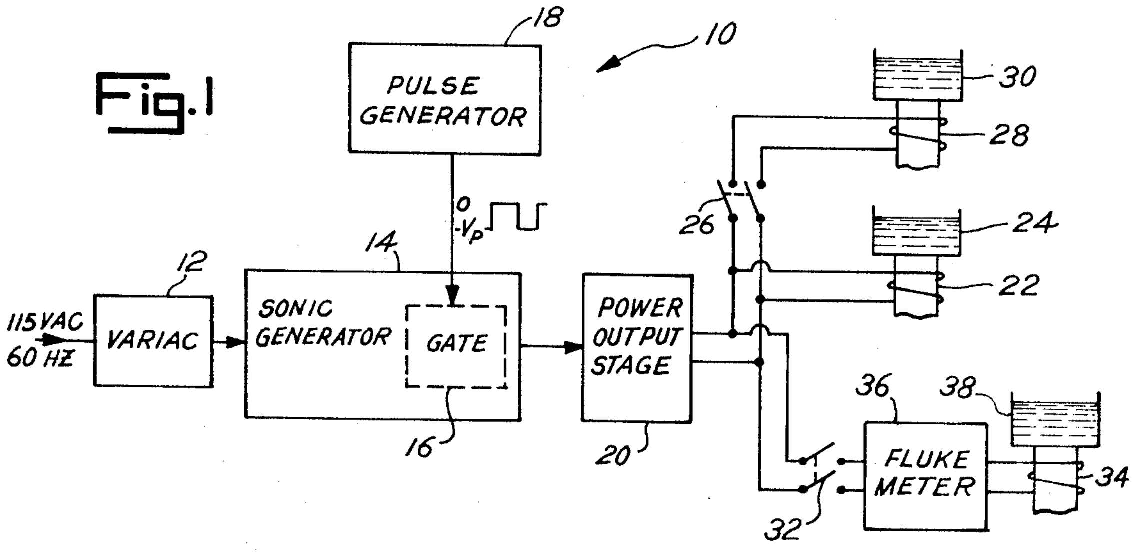
FIG. 1 is a pictorial block diagram of a variable gated sonic cleaner.

Referring to FIG. 1, the control portion of the pulse modulated sonic generator is represented generally by reference numeral 10. A variac 12 is used to vary the magnitude of 115 volt AC line voltage to the desired energy level. The output of the variac 12 is fed into sonic generator 14. Within the sonic generator 14, the line voltage from the variac is converted into DC voltages and a sonic control signal. Also, within the sonic generator 14 is a gate 16 that is operated by a pulse generator 18. Only when the pulse generator 18 is at a given voltage level will the gate circuit 16 allow the sonic generator 14 to transfer a sonic control frequency to a power output stage 20. By varying the width of the voltage from pulse generator 18, the length of time that gate 16 will allow a sonic output signal to operate the power output stage 20 is directly proportional to the pulse width. Therefore, by varying the pulse width from pulse generator 18, the width of the pulse modulation to power output stage 20 can be varied.

Within the power output stage 20, the sonic signal from sonic generator 14 is amplified to give the necessary power to drive sonic transducers. The output from power output stage 20 is directly connected to sonic transducer 22 which vibrates cleaning tank 24. By a proper switching arrangement 26, other sonic transducers 28 can be connected to the output of power output stage 20 to vibrate other cleaning tanks 30. The number of transducers and the number of cleaning tanks operated by the power output stage 20 is limited only by the power capabilities of the individual system. As a means of checking the power requirements for a given transducer, switch 32 may be closed which connects test transducer 34 to the power output stage 20 through the Fluke volt-amp-watt meter 36. Test transducer 34 vibrates test tank 38. The Fluke meter 36 measures the amount of power required to vibrate the test tank 38 to produce sonic cleaning. By a measurement of the power requirements for a test transducer and knowledge of the power capabilities of the power output stage 20, a person can calculate the number of transducers that can be driven by a single power output stage. One of the major functions of the test circuit is for the Fluke meter 36 to measure the power requirements as the pulse generator output is varied. This allows the selection of the most efficient mode of operation.

Figure 2:
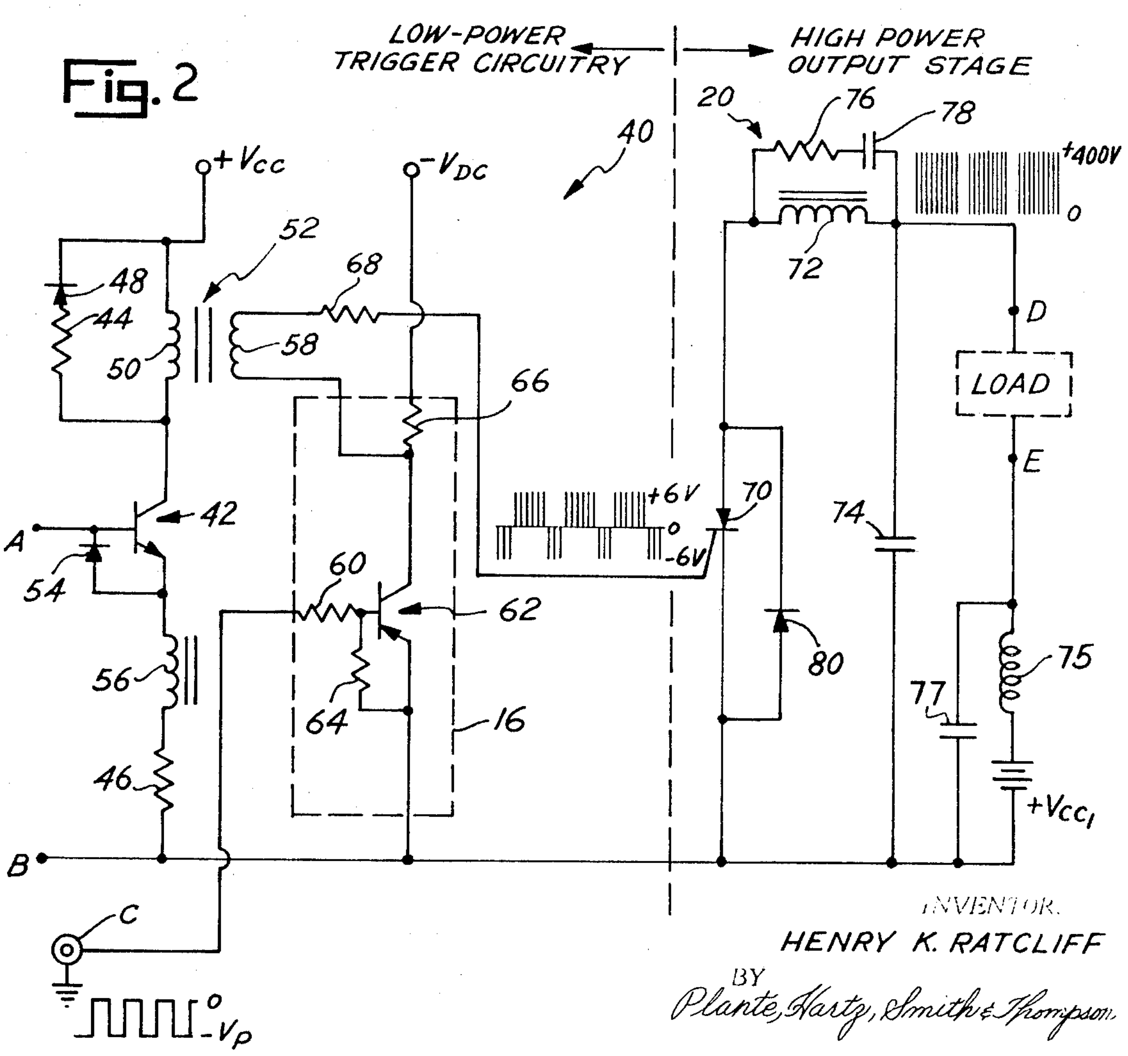
FIG. 2 is a circuit schematic of a portion of the sonic generator and the power output stage shown in FIG. 1.

Referring now to FIG. 2, reference numeral 40 designates generally a portion of the low-power trigger circuitry of sonic generator 14. A sonic frequency signal is fed into terminals A and B of the low-power trigger circuitry 40. The sonic frequency is generated in another portion of the sonic generator 14 that is not shown in the detailed schematic of FIG. 2. A positive signal from the sonic frequency input A triggers transistor 42 which provides isolation between the low-voltage DC supply $-V_{DC}$ and the high-voltage DC supply $=V_{CC}$. The resistors 44 and 46 serve as current limiters to a transistor 42. The diode 48 in series with resistor 44 across winding 50 of transformer 52 provides protection for a transistor 42 to keep it from exceeding its maximum current limitations. Diode 54 connected between the base and emitter of transistor 42 is also included to keep transistor 42 from exceeding its maximum current limitations. Transformer 52 uses winding 56 as a feedback network for a transistor 42. Upon receiving a sonic frequency input at terminal A, transistor 42 operates as a blocking oscillator. Winding 58 of transformer 52 is used for coupling the sonic frequency received at terminal A to the succeeding circuitry, as will be described subsequently.

When the sonic frequency input at terminal A goes in the positive direction, transistor 42 begins to conduct. The conduction of transistor 42 causes current to flow through windings 50 and 56 of transformer 52 and resistor 46. When a positive voltage no longer exists on the base of transistor 42, the transistor stops conduction. However, because current in windings 50 and 56 cannot stop instantaneously, the winding 50 discharges through the resistor 44 and diode 48, and winding 56 discharges through resistor 46 and diode 54. Winding 56 is mutually coupled to winding 50 to provide a feedback from the output winding 50 to input of transistor 42. The mutually coupled winding 58 has a voltage signal that is directly proportional to the current flowing in winding 50. However, the turns ratio between windings 50, 56 and 58 of transformer 52 can vary according to the desired voltage output or the desired feedback. A typical turns ratio between winding 50, 56 and 58 would be 5:1:1, respectively.

The gate circuit 16 of sonic generator 14 is enclosed in broken lines in FIG. 2. The output in the pulse generator 18 is fed into terminal C of sonic generator 14. Terminal C is connected through resistor 60 to the base of gating transistor 62. Resistor 64 provides the necessary biasing to turn transistor 62 into the conducting stage when a negative signal is received at its base. The relationship between resistors 60 and 64 determine the voltage from the pulse generator 18 necessary to change transistor 62 to the conducting stage. Voltages as low as 1 volt may be used. Assuming that the signal from the pulse generator 18 is a zero to negative signal, then transistor 62 will only conduct when a negative signal is received from the pulse generator. The negative signal represented by $-V_P$ is fed through resistor 60 into the base of transistor 62. Upon receiving the negative signal, transistor 62 starts conducting thereby connecting winding 58 to input terminal B. However, if no signal is being received from the pulse generator 18, winding 58 will be connected through low value resistor 66 to a negative DC supply represented by $-V_{DC}$. The supply $-V_{DC}$ can vary over a range of negative voltages with about 8 volts being needed to produce a typical negative control signal as will be subsequently described.

The output of winding 58 is effected in the following manner. If transistor 62 is conducting, the output of winding 58 will be a small positive signal (6 volts being a typical example) of the same frequency as the sonic input on input terminal A. However, if transistor 62 is not conducting, winding 58 will be connected through low value resistor 66 to the voltage supply $-V_{DC}$ to give a small negative signal output (minus 6 volts being a typical example) of the same frequency as the sonic signal connected to input terminal A. The range of voltage outputs from winding 58 could be varied according to the desired parameters of an individual system. Coupling resistor 68 provides a current-limiting function for the winding 58.

The power output stage 20 is controlled by the small control signal received from winding 58. The control signal triggers silicon control rectifier (SCR) 70 which begins to conduct upon receiving a positive signal from winding 58. The SCR 70 is connected in series with resonant inductor 72 and commutating capacitor 74. A load is connected across output terminals D and E in series with high impedance coil 75 and high-voltage source $+V_{CC1}$. A low impedance capacitor 77 is connected in parallel with high impedance inductor 75 and high-voltage source $+V_{CC1}$ to give a constant voltage output equal $+V_{CC}$. The load and the high-voltage source $+V_{CC1}$ are connected across commutating capacitor 74. A transient suppressor network consisting of resistor 76 and capacitor 78 is connected across resonant inductor 72 to reduce transient noise problems. Also, diode 80 allows a reverse current to flow in the power output stage 20.

A description of how this circuit operates is most easily understood when analyzing one cycle of operation. When the AC power is applied to the control portion 10, the commutating capacitor 74 charges toward the voltage supplied by the high-voltage source $+V_{CC1}$. The SCR 70 being off and in parallel with commutating capacitor 74 receives the same voltage. When the voltage across commutating capacitor 74 is nearing its peak, a trigger pulse appears at the gate of the SCR 70 changing it to its low impedance condition. Because of the resonant discharge of commutating capacitor 74 through resonant inductor 72, a sinusoidal current will flow from anode to cathode of the SCR 70. The resonant discharge current is much larger than the DC charging current from the high-voltage supply $+V_{CC1}$. Therefore, commutating capacitor 74 will be discharged and charged in the reverse direction. Since the SCR 70 cannot conduct in the reverse direction, it turns to a high impedance off condition. Commutating capacitor 74 continues to discharge through diode 80 and the high-voltage power supply $+V_{CC1}$ then begins to recharge after diode 80 turns off. The cycle then repeats itself.

As long as a positive sonic frequency signal input is being received on the gate of SCR 70, a sonic power output is realized across load terminals D and E. However, if due to the gate circuit 16, a negative sonic frequency signal is received by SCR 70, it will not be switched to its low impedance stage. Since commutating capacitor 74 is charged to a voltage approximately equal to the high-voltage supply $+V_{CC1}$, no voltage will be realized across the output terminals D through E. The time period wherein the gate circuit 16 allows a positive signal to trigger the SCR 70 is equal to the duty cycle of the sonic generator. By varying the input to the gate circuit 16, the duty cycle of modulation can be varied. The gate circuit 16 is varied by the external pulse generator 18.

To a person of ordinary skill in the art, it should be obvious that the frequency of the power output is of the same frequency as the sonic input at terminals A and B. However, the output voltage at terminals D and E has been pulse modulated by the gating circuit 16 which effectively inverts portions of the signal received at the gate of SCR 70. By varying the pulse width of the signal received from pulse generator 18, varying amounts of pulse width modulation or duty cycle can be obtained. Also, by varying the frequency of pulse generator 18, the repetition rate of the pulse width modulation can also be varied. By varying both the pulse width and the pulse frequency, a person can select the most efficient type of pulse width modulation for a sonic generator. By utilizing the test tank 38 and the test transducer 34 in series with Fluke meter 36, a person could vary the pulse width and the pulse frequency of the output signal from pulse generator 18 to select the most efficient mode of operation. When the most efficient mode of operation has been selected, the Fluke meter 36 could be removed or the power output stage 20 could be switched to an identical tank and transducer.

As an example, suppose a conventional 150 watt sonic generator that performs a circuit cleaning operation in 1 minute has been modified for a gated sonic power output. By adjusting the pulse generator 18 so that a sonic power output at terminals D through E is available only 10 percent of the time, it may be found that the cleaning operation can be performed in 1½ minute. Since the AC power input at this particular duty cycle is only one-tenth that of the unmodified cleaning system, a significant reduction in cleaning costs has been achieved.

As a typical example of the voltage levels in FIG. 2, the high-voltage supply $+V_{CC}$ may operate at 100 volts DC. The negative supply $-V_{DC}$ may operate between 0 and −10 volts. A typical voltage operation level would be approximately −8 volts. The signal received from the pulse generator 18 at the base of transistor 62 should be large enough to switch transistor 62 from the nonconducting to the conducting stage. The output voltage across terminals D through E is dependent upon the quiescent operating point of the system determined by resonant inductor 72 and commutating capacitor 74. A typical example would be an output voltage that varies from +200 to −200 volts. Considering terminal E as being equal to ground, then output voltage across the load would vary from 0 to 400 volts. The duty cycle can be varied from 10 to 90 percent and the frequency can be varied 10 to 300 cycles per second for most sonic generators. Other variations, though possible, would not produce a more efficient cleaning by the sonic generator.

I claim:

1. A sonic generator for operating a liquid cleaning apparatus at an optimum efficiency by modulation of an operational pulsing signal, said generator comprising:

measuring means connected to said cleaning apparatus for determining an optimum operating frequency with varying loads;

means for converting AC line voltage into a constant voltage;

means for generating a control signal from said constant voltage, said control signal functionally corresponding to said optimum operating frequency;

gate means having a transistorized switch connected in series with an output section of a transformer coupling for separating said control signal into an inverted portion and a noninverted portion;

pulse-generating means adaptable with said measuring means and connected to said transistorized switch of said gate means for regulating the duration and frequency of the inverted and noninverted portion of the control signal to produce an output signal;

rectifying means for switching from a conducting to a nonconducting mode in response to said noninverted portions of said control signal; and a series resonant circuit in parallel with said rectifying means and connected to an oscillating device which vibrates said load, said resonant circuit having a capacitive portion, said capacitive portion being charged and discharged with the same frequency as said inverted and noninverted portions of said control signal to create a pulse modulated output voltage operating said oscillating device to produce maximum cavitation in the liquid cleaning apparatus as determined by said measuring means.

2. The pulse-modulated sonic generator, as recited in claim 1, wherein said switching means is a silicon controlled rectifier with a trigger being received from said control signal.

3. A control system for providing a pulse-modulated power output to operate a liquid cleaning apparatus at an optimum cavitation frequency, comprising:

measuring means connected to said cleaning apparatus for determining the maximum effective operating frequency with varying loads;

means for generating control pulses from a voltage source in response to an internally controlled frequency derived from said measuring means;

first switching means for interrupting said control pulses for a predetermined time interval to produce a pulsed output voltage signal, said time interval being variable in frequency and duration to allow for the selection of an operating mode which will give maximum efficiency corresponding to said measuring means;

pulse-generating means connected to said first switching means for providing signals to control the duration of said time interval;

second switching means connected to said control pulse generating means for relaying a DC voltage across a coupling means, said coupling means being electrically connected to said first switching means for sequentially interrupting said control pulse;

third switching means connected to said first switching means and in parallel with a resonant circuit and a capacitor circuit, said third switching means controlling charging and discharging of said resonant circuit in response to the pulsed output voltage from said first switching means to produce a controlled output voltage operational signal; and output means connected to said resonant circuit and said cleaning apparatus, said output means producing uniform cavitation in the liquid cleaning apparatus in response to said controlled output voltage.

* * * * *